US012593184B2

(12) United States Patent
Milne et al.

(10) Patent No.: US 12,593,184 B2
(45) Date of Patent: Mar. 31, 2026

(54) HEARING AID LISTENING TEST PRESETS

(71) Applicant: Sony Group Corporation, Tokyo (JP)

(72) Inventors: James R. Milne, Romona, CA (US); Justin Kenefick, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 315 days.

(21) Appl. No.: 18/115,483

(22) Filed: Feb. 28, 2023

(65) Prior Publication Data

US 2024/0163621 A1 May 16, 2024

Related U.S. Application Data

(60) Provisional application No. 63/383,557, filed on Nov. 14, 2022.

(51) Int. Cl.
*H04R 25/00* (2006.01)

(52) U.S. Cl.
CPC ............ *H04R 25/70* (2013.01); *H04R 25/50* (2013.01)

(58) Field of Classification Search
CPC ................................ H04R 25/70; H04R 25/50
See application file for complete search history.

(56) References Cited

U.S. PATENT DOCUMENTS 9,468,401 B2 10/2016 Van Hasselt
10,595,135 B2 3/2020 Li
11,425,516 B1 8/2022 Gavish
2003/0083591 A1* 5/2003 Edwards ................ G16H 80/00 600/300
2008/0165980 A1* 7/2008 Pavlovic .................. H04R 5/04 381/60
2010/0119093 A1 5/2010 Uzuanis
2011/0250932 A1* 10/2011 Cohen .................. H04R 25/505 455/569.1
2012/0230501 A1* 9/2012 Ganter ................... A61B 5/121 381/58
2019/0356989 A1 11/2019 Li

OTHER PUBLICATIONS https://www.soniccloud.com/the-hearing-assessment.

* cited by examiner

*Primary Examiner* — Suhan Ni
(74) *Attorney, Agent, or Firm* — Trellis IP Law Group, PC

(57) ABSTRACT

A computer-implemented method performed on a user device includes receiving a signal from an auditory device. The method further includes generating a hearing profile for a user associated with the user device. The method further includes implementing a pink noise band test. The method further includes determining one or more presets that correspond to user preferences. The method further includes updating the hearing profile based on the pink noise band test and the one or more presets. The method further includes transmitting the hearing profile to the auditory device.

20 Claims, 10 Drawing Sheets

500

HEARING AID LISTENING TEST PRESETS

CROSS REFERENCES TO RELATED APPLICATIONS

This application claims the benefit of U.S. Provisional Patent Application Ser. No. 63/383,557, entitled "Hearing Aid Listening Test Presets", filed on Nov. 14, 2022, 2022 (SYP350104US01), which is hereby incorporated by reference as if set forth in full in this application for all purposes.

BACKGROUND

On Oct. 22, 2022, the Food and Drug Administration's ruling went into effect that allows consumers to purchase over-the-counter hearing aids without a medical exam, prescription, or professional fitting. Currently most hearing tests involve listening to test tones that are based on a single frequency at a time, such as 1 kilohertz and then the amplitude is increased until the listener can hear that tone. This method fails to simulate how humans hear in the real world. For example, individual sounds contain complex harmonics. Furthermore, humans detect multiple sounds in an environment at any given time, such as when music is playing.

SUMMARY

In some embodiments, a computer-implemented method performed on a user device includes receiving a signal from an auditory device. The method further includes generating a hearing profile for a user associated with the user device. The method further includes implementing a speech test or a music test. The method further includes updating the hearing profile based on the speech test or the music test. The method further includes determining one or more presets that correspond to user preferences. The method further includes transmitting the hearing profile and the one or more presets to the auditory device.

In some embodiments, the auditory device is a first type of auditory device and the one or more presets include a preset for a second type of auditory device. In some embodiments, determining the one or more presets includes generating graphical data for displaying a user interface that includes an option for specifying that the one or more presets are selected from a group of a noise cancellation preset, an ambient noise preset, a speech and music preset, a music in a room preset, a voice in a crowded room preset, and combinations thereof. In some embodiments, determining the one or more presets includes generating graphical data for displaying a user interface that includes an option for providing the user preferences that includes one or more presets selected from a group of a type of enclosure, a type of speech, a type of music, a type of noise, a type and model of auditory device, a type of auditory condition, and combinations thereof. In some embodiments, the method further comprises generating graphical data for displaying a user interface that includes an option to change the one or more presets. In some embodiments, the method further comprises receiving feedback from the user to change the one or more presets and updating the one or more presets based on the feedback. In some embodiments, determining the one or more presets includes asking a user to identify one or more auditory conditions that affect hearing. In some embodiments, the method further includes implementing a pink noise band test by: instructing the auditory device to play a test sound at a listening band, determining whether a confirmation was received that the user heard the test sound, responsive to not receiving the confirmation, instructing the auditory device to increase a volume of the test sound until the confirmation is received or the test sound is played at a decibel level that meets a decibel threshold, responsive to receiving the confirmation that the user heard the test sound or the test sound was played at the decibel threshold is met, advancing the listening band to a subsequent increment, continuing to repeat previous steps until the listening band meets a listening band total, and updating the hearing profile based on the pink noise band test. In some embodiments, the speech test is implemented by: instructing the auditory device to play a test sound of speech, determining whether a confirmation was received that the user heard the test sound, responsive to receiving the confirmation that the user heard the test sound or determining that a threshold amount of time has elapsed, determining whether all test sounds in a set of test sounds have been played, and continuing to repeat the previous steps until the test sounds in the set of test sounds have been played. In some embodiments, the music test is implemented by: instructing the auditory device to play a test sound of music, determining whether a confirmation was received that the user heard the test sound, responsive to receiving the confirmation that the user heard the test sound or determining that a threshold amount of time has elapsed, determining whether all test sounds in a set of test sounds have been played, and continuing to repeat the previous steps until the test sounds in the set of test sounds have been played. In some embodiments, the method further includes modifying the hearing profile to include instructions for producing sounds based on a corresponding frequency according to a Fletcher Munson curve.

In some embodiments, an apparatus includes one or more processors and logic encoded in one or more non-transitory media for execution by the one or more processors and when executed are operable to: receive a signal from an auditory device, generate a hearing profile for a user associated with a user device, implement a speech test or a music test, update the hearing profile based on the speech test or the music test, determine one or more presets that correspond to user preferences, and transmit the hearing profile and the one or more presets to the auditory device.

In some embodiments, the auditory device is a first type of auditory device and the one or more presets include a preset for a second type of auditory device. In some embodiments, determining the one or more presets includes generating graphical data for displaying a user interface that includes an option for specifying that the one or more presets are selected from a group of a noise cancellation preset, an ambient noise preset, a speech and music preset, a music in a room preset, a voice in a crowded room preset, and combinations thereof. In some embodiments, determining the one or more presets includes generating graphical data for displaying a user interface that includes an option for providing the user preferences that includes one or more presets selected from a group of a type of enclosure, a type of speech, a type of music, a type of noise, a type and model of auditory device, a type of auditory condition, and combinations thereof. In some embodiments, the one or more processors are further operable to generate graphical data for displaying a user interface that includes an option to change the one or more presets.

In some embodiments, software is encoded in one or more computer-readable media for execution by the one or more processors and when executed is operable to: receive a signal from an auditory device, generate a hearing profile for a user associated with a user device, implement a speech test or a music test, update the hearing profile based on the speech test or the music test, determine one or more presets that correspond to user preferences, and transmit the hearing profile and the one or more presets to the auditory device.

In some embodiments, determining the one or more presets includes generating graphical data for displaying a user interface that includes an option for specifying that the one or more presets are selected from a group of a noise cancellation preset, an ambient noise preset, a speech and music preset, a music in a room preset, a voice in a crowded room preset, and combinations thereof. In some embodiments, determining the one or more presets includes generating graphical data for displaying a user interface that includes an option for providing the user preferences that includes one or more presets selected from a group of a type of enclosure, a type of speech, a type of music, a type of noise, a type and model of auditory device, a type of auditory condition, and combinations thereof. In some embodiments, the one or more processors are further operable to generate graphical data for displaying a user interface that includes an option to change the one or more presets.

The technology advantageously creates a more realistic hearing profile that identifies certain hearing conditions that are missed by traditional hearing profiles. In addition, the hearing profile includes presets that address user preferences for audio configurations in particular situations.

A further understanding of the nature and the advantages of particular embodiments disclosed herein may be realized by reference of the remaining portions of the specification and the attached drawings.

DETAILED DESCRIPTION OF EMBODIMENTS

Example Environment 100

Figure 1:
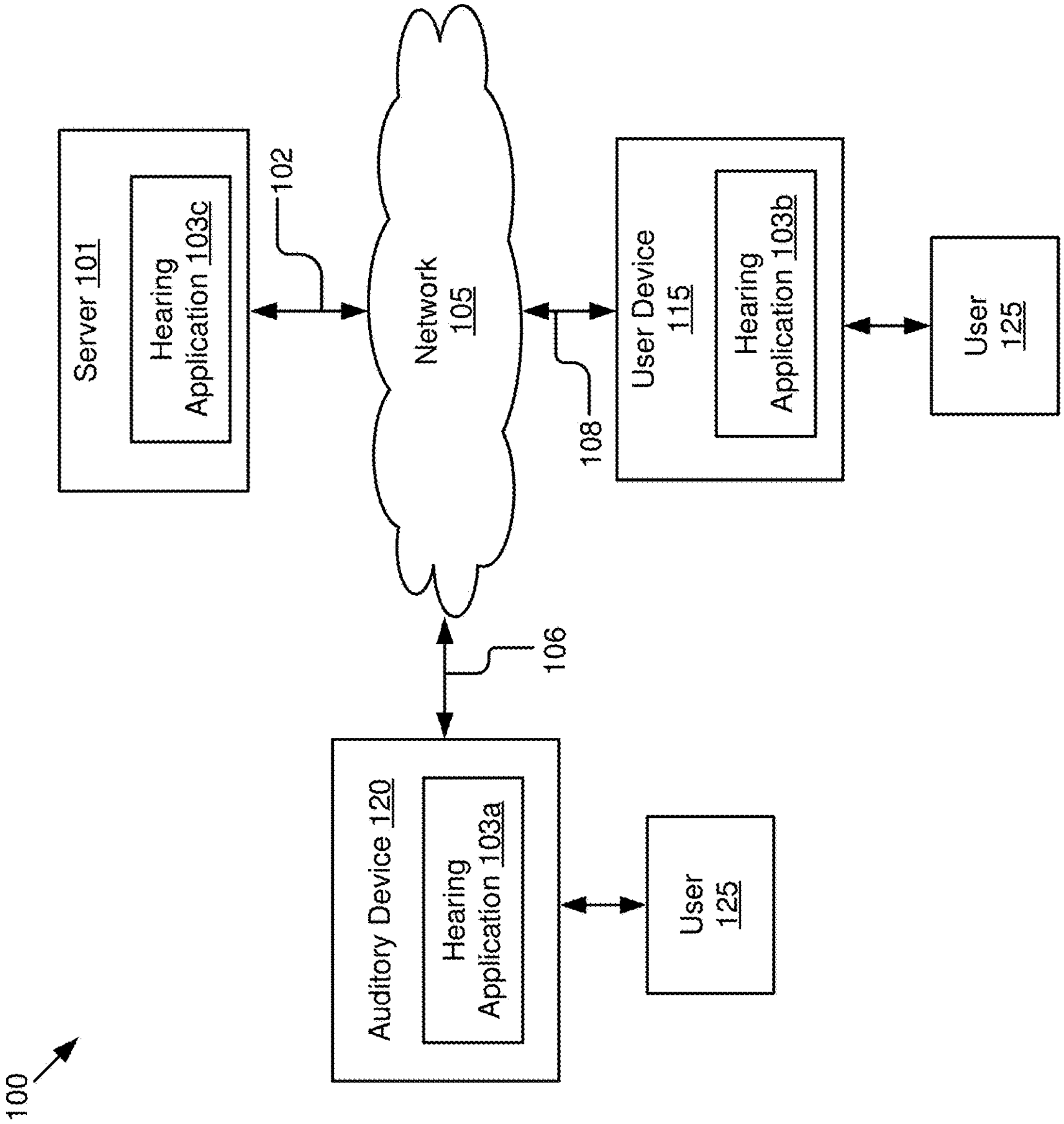
FIG. 1 is a block diagram of an example network environment according to some embodiments described herein.

FIG. 1 illustrates a block diagram of an example environment 100. In some embodiments, the environment 100 includes an auditory device 120, a user device 115, and a server 101. A user 125 may be associated with the user device 115 and/or the auditory device 120. In some embodiments, the environment 100 may include other servers or devices not shown in FIG. 1. In FIG. 1 and the remaining figures, a letter after a reference number, e.g., "103*a*," represents a reference to the element having that particular reference number (e.g., a hearing application 103*a* stored on the user device 115). A reference number in the text without a following letter, e.g., "103," represents a general reference to embodiments of the element bearing that reference number (e.g., any hearing application).

The auditory device 120 may include a processor, a memory, a speaker, and network communication hardware. The auditory device 120 may be a hearing aid, earbuds, headphones, or a speaker device. The speaker device may include a standalone speaker, such as a soundbar or a speaker that is part of a device, such as a speaker in a laptop, tablet, phone, etc.

The auditory device 120 is communicatively coupled to the network 105 via signal line 106. Signal line 106 may be a wired connection, such as Ethernet, coaxial cable, fiber-optic cable, etc., or a wireless connection, such as Wi-Fi®, Bluetooth®, or other wireless technology.

In some embodiments, the auditory device 120 includes a hearing application 103*a* that performs hearing tests. For example, the user 125 may be asked to identify sounds emitted by speakers of the auditory device 120 and the user may provide user input, for example, by pressing a button on the auditory device 120, such as when the auditory device is a hearing aid, earbuds, or headphones. In some embodiments where the auditory device 120 is larger, such as when the auditory device 120 is a speaker device, the auditory device 120 may include a display screen that receives touch input from the user 125.

In some embodiments, the auditory device 120 communicates with a hearing application 103*b* stored on the user device 115. During testing, the auditory device 120 receives instructions from the user device 115 to emit test sounds at particular decibel levels. Once testing is complete, the auditory device 120 receives a hearing profile that includes instructions for how to modify sound based on different factors, such as frequencies, types of sounds, one or more presets, etc. The auditory device 120 may also receive instructions from the user device 115 to emit different combinations of sounds in relation to determining user preferences that memorialized as one or more presets. For example, the auditory device 120 may identify an environment, such as a crowded room, where multiple people are speaking and modify the sound based on one or more presets. The auditory device 120 may amplify certain sounds and filter out other sounds based on the one or more presets convert the modified sounds to sound waves that are output through a speaker associated with the auditory device 120.

The user device 115 may be a computing device that includes a memory, a hardware processor, and a hearing application 103*b*. The user device 115 may include a mobile device, a tablet computer, a laptop, a desktop computer, a mobile telephone, a wearable device, a head-mounted display, a mobile email device, or another electronic device capable of accessing a network 105 to communicate with one or more of the server 101 and the auditory device 120.

In the illustrated implementation, user device 115 is coupled to the network 105 via signal line 108. Signal line 108 may be a wired connection, such as Ethernet, coaxial cable, fiber-optic cable, etc., or a wireless connection, such as Wi-Fi®, Bluetooth®, or other wireless technology. The user device 115 is used by way of example. While FIG. 1 illustrates one user device 115, the disclosure applies to a system architecture having one or more user devices 115.

In some embodiments, the hearing application 103*b* includes code and routines operable to connect with the auditory device 120 to receive a signal, such as by making a connection via Bluetooth® or Wi-Fi®; generate a hearing profile for a user 125 associated with the user device 115; implement a speech test or a music test; update the hearing profile based on the speech test or the music test; determine one or more presents that correspond to a user preference; and transmit the hearing profile and the one or more presets to the auditory device 120.

The server 101 may include a processor, a memory, and network communication hardware. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the server includes a hearing application 103*c*. In some embodiments and with user consent, the hearing application 103*c* on the server 101 maintains a copy of the hearing profile and the one or more presets. In some embodiments, the server 101 maintains audiometric profiles generated by an audiologist for different situations, such as an audiometric profile of a person with no hearing loss, an audiometric profile of a man with no hearing loss, an audiometric profile of a woman with hearing loss, etc.

Figure 2:
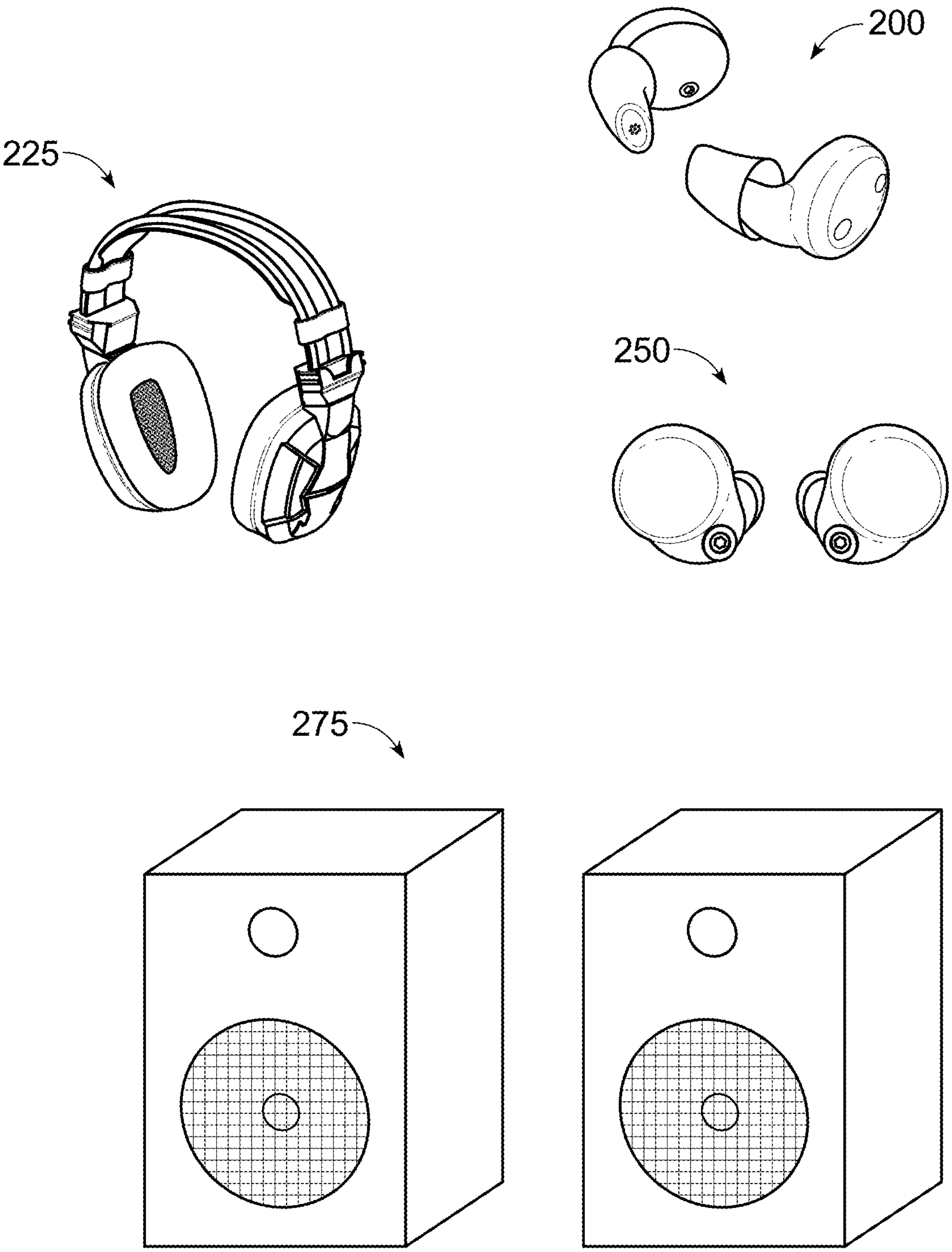
FIG. 2 is an illustration of example auditory devices according to some embodiments described herein.

FIG. 2 illustrates example auditory devices. Specifically, FIG. 2 illustrates a hearing aid 200, headphones 225, earbuds 250, and a speaker device 275. In some embodiments, each of the auditory devices is operable to receive instructions from the hearing application 103 to produce sounds that are used to test a user's hearing and modify sounds produced by the auditory device based on a hearing profile.

Example Computing Device 300

Figure 3:
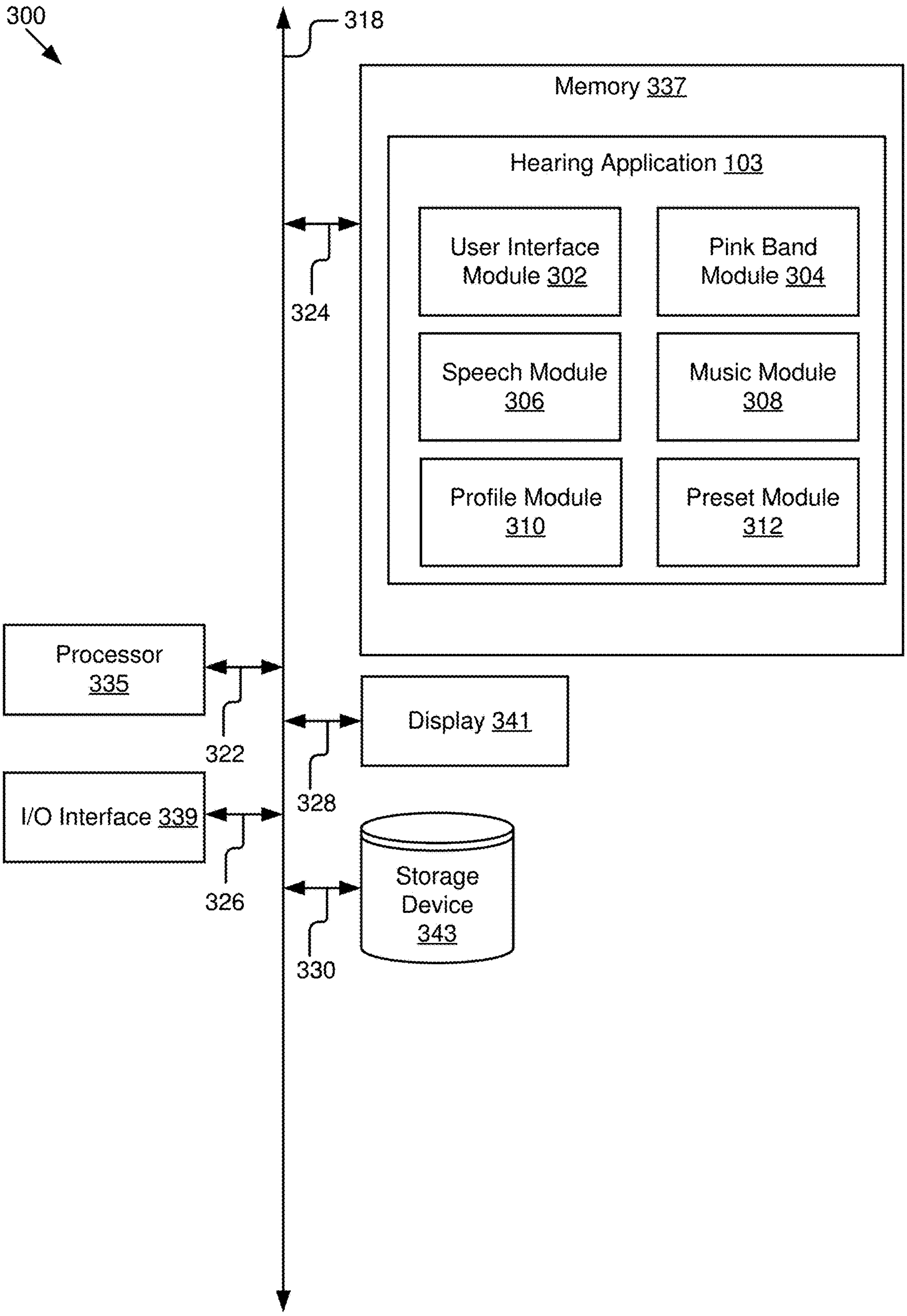
FIG. 3 is a block diagram of an example computing device according to some embodiments described herein.

FIG. 3 is a block diagram of an example computing device 300 that may be used to implement one or more features described herein. The computing device 300 can be any suitable computer system, server, or other electronic or hardware device. In one example, the computing device 300 is the user device 115 illustrated in FIG. 1.

In some embodiments, computing device 300 includes a processor 335, a memory 337, an Input/Output (I/O) interface 339, a display 341, and a storage device 343. The processor 335 may be coupled to a bus 318 via signal line 322, the memory 337 may be coupled to the bus 318 via signal line 324, the I/O interface 339 may be coupled to the bus 318 via signal line 326, the display 341 may be coupled to the bus 318 via signal line 328, and the storage device 343 may be coupled to the bus 318 via signal line 330.

The processor 335 can be one or more processors and/or processing circuits to execute program code and control basic operations of the computing device 300. A processor includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 337 is typically provided in computing device 300 for access by the processor 335 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 335 and/or integrated therewith. Memory 337 can store software operating on the computing device 300 by the processor 335, including the hearing application 103.

The I/O interface 339 can provide functions to enable interfacing the computing device 300 with other systems and devices. Interfaced devices can be included as part of the computing device 300 or can be separate and communicate with the computing device 300. For example, network communication devices, storage devices (e.g., the memory 337 or the storage device 343), and input/output devices can communicate via I/O interface 339. In some embodiments, the I/O interface 339 can connect to interface devices such as input devices (keyboard, pointing device, touchscreen, microphone, sensors, etc.) and/or output devices (display 341, speakers, etc.).

The display 341 may connect to the I/O interface 339 to display content, e.g., a user interface, and to receive touch (or gesture) input from a user. The display 341 can include any suitable display device such as a liquid crystal display (LCD), light emitting diode (LED), or plasma display screen, cathode ray tube (CRT), television, monitor, touchscreen, or other visual display device.

The storage device 343 stores data related to the hearing application 103. For example, the storage device 343 may store hearing profiles generated by the hearing application 103, sets of test sounds for testing speech, sets of test sounds for testing music, etc.

Although particular components of the computing device 300 are illustrated, other components may be added or removed.

Example Hearing Application 103

In some embodiments, the hearing application 103 includes a user interface module 302, a pink band module 304, a speech module 306, a music module 308, a profile module 310, and a preset module 312.

The user interface module 302 generates a user interface. In some embodiments, the user interface module 302 includes a set of instructions executable by the processor 335 to generate the user interface. In some embodiments, the user interface module 302 is stored in the memory 337 of the computing device 300 and can be accessible and executable by the processor 335.

In some embodiments, a user downloads the hearing application 103 onto a computing device 300. The user interface module 302 may generate graphical data for displaying a user interface where the user provides input that the profile module 310 uses to generate a hearing profile for a user. For example, the user may provide a username and password, input their name, and provide an identification of an auditory device (e.g., identify whether the auditory device is a hearing aid, headphones, earbuds, or a speaker device).

In some embodiments, the user interface includes an option for specifying a particular type of auditory device and a particular model that is used during testing. For example, the hearing aids may be Sony C10 self-fitting over-the-counter hearing aids (model CRE-C10) or E10 self-fitting over-the-counter hearing aids (model CRE-E10). The identification of the type of auditory device is used for, among other things, determining a beginning decibel level for the test sounds. For example, because hearing aids, earbuds, and headphones are so close to the ear (and are possibly positioned inside the ear), the beginning decibel level for a hearing aid is 0 decibels. For testing of a speaker device, the speaker device should be placed a certain distance from the user and the beginning decibel level may be modified according to that distance. For example, for a speaker device that is within 5 inches of the user, the beginning decibel level may be 10 decibels.

Figure 4A:
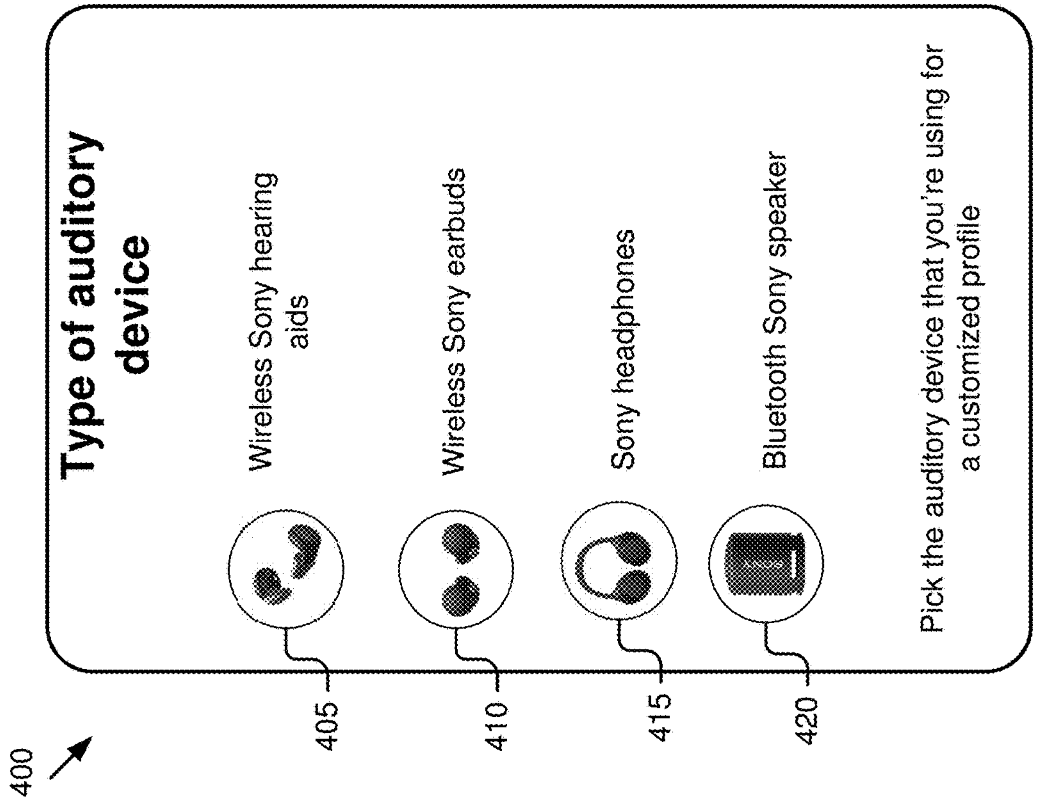
FIG. 4A is an example user interface for specifying a type of auditory device according to some embodiments described herein.

Turning to FIG. 4A, an example user interface 400 for specifying a type of auditory device is illustrated. The user interface module 302 generates graphical data for displaying a list of types of auditory devices. In this example, the user may select the type of auditory device by selecting the hearing aids icon 405 for wireless Sony hearing aids, the earbuds icon 410 for wireless Sony earbuds, the headphones icon 415 for Sony headphones, or the speaker icon 415 for the Bluetooth® Sony speaker. In some embodiments, the user interface module 302 may generate graphical data to display a list of models from other manufacturers.

In some embodiments, once the user has selected a type of auditory device, the user interface module 302 generates a user interface for specifying a model of the auditory device. For example, if the user selects the headphones icon 415 in FIG. 4A, the user interface module 302 may generate graphical data for displaying a list of different types of Sony headphones. For example, the list may include WH-1000XM4 wireless Sony headphones, WH-CH710N wireless Sony headphones, MDR-ZX110 wired Sony headphones, etc. Other Sony headphones may be selected. In some embodiments, the user interface module 302 may generate graphical data to display a list of models from other manufacturers.

The user interface module 302 may generate graphical data for displaying a user interface that enables a user to make a connection between the computing device 300 and the auditory device. For example, the auditory device may be Bluetooth enabled and the user interface module 302 may generate graphical data for instructing the user to put the auditory device in pairing mode. The computing device 300 may receive a signal from the auditory device via the I/O interface 339 and the user interface module 302 may generate graphical data for displaying a user interface that guides the user to select the auditory device from a list of available devices.

The user interface module 302 generates graphical data for displaying a user interface that allows a user to select a hearing test. In some embodiments, the user interface provides an option to select one or more of a pink noise band test first, a speech test, and a music test. In some embodiments, the user may select which type of test is performed first. In some embodiments, before testing begins the user interface includes an instruction for the user to move to an indoor area that is quiet and relatively free of background noise.

In some embodiments, the user interface includes an option for specifying if a user has one or more auditory conditions, such as tinnitus, hyperacusis, or phonophobia. If the user has a particular condition, the corresponding modules may modify the hearing tests accordingly. For example, hyperacusis is a condition where a user experiences discomfort from very low intensity sounds and less discomfort as the frequency increases. As a result, if a user identifies that they have hyperacusis, the pink band module 304 may instruct the auditory device to emit sounds at an initial lower decibel level that is 20-25 decibels lower for frequencies in the lower range (e.g., 200 Hertz) and progressively increase the initial lower decibel level as the frequency increases until 10,000 Hertz when users typically do not experience hyperacusis. Similarly, phonophobia is a fear or emotional reaction to certain sounds. If a user identifies that they have phonophobia, the music module 308 may instruct the auditory device to skip sounds that the user identifies as problematic.

Figure 4B:
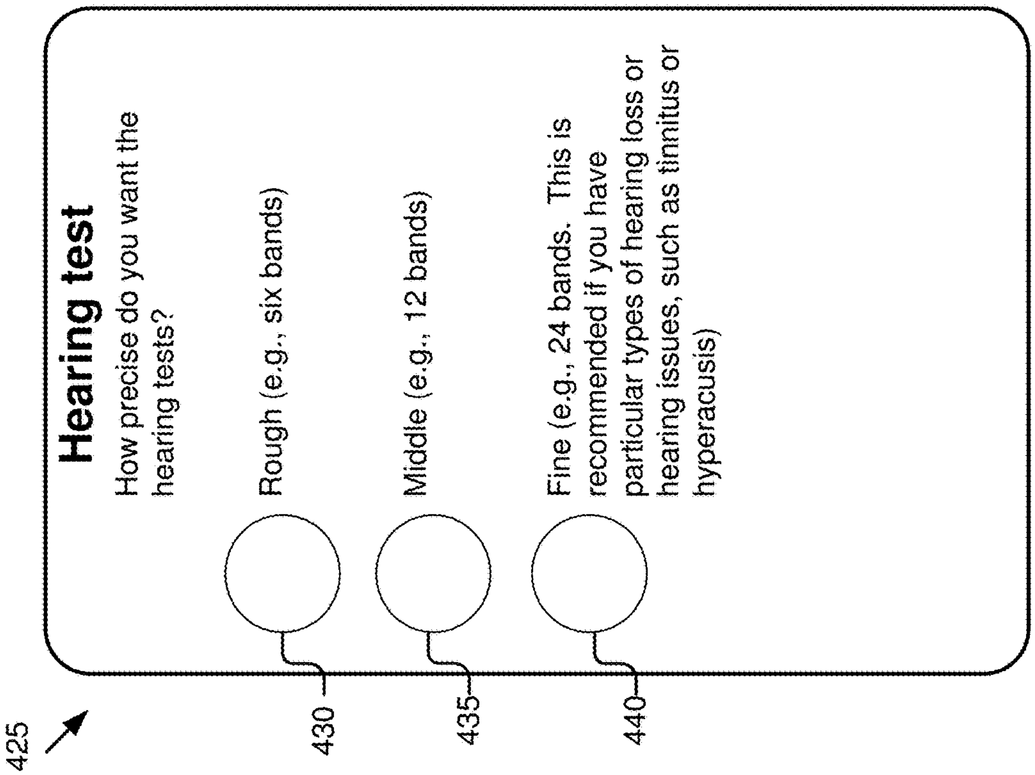
FIG. 4B is an example user interface for selecting a level of granularity of the hearing test according to some embodiments described herein.

In some embodiments, the user interface module 302 generates graphical data for displaying a user interface to select two or more levels of granularity for numbers of listening bands. FIG. 4B is an example user interface 425 for selecting a level of granularity of the hearing test. In this example, the user interface 425 includes three levels: rough, which may include six bands; middle, which may include 12 bands; and fine, which may include 24 bands. The user may select one of the three buttons 430, 435, 440 to request the corresponding level of granularity.

In some embodiments, the user interface module 302 generates graphical data for displaying a user interface to select a number of listening bands for the pink noise testing. For example, the user interface may include radio buttons for selecting a particular number of listening bands or a field where the user may enter a number of listening bands.

Once the different tests begin, in some embodiments, the user interface module 302 generates graphical data for displaying a user interface with a way for the user to identify when the user hears a sound. For example, the user interface may include a button that the user can select when the user hears a sound. In some embodiments, the user interface displayed during speech testing includes a request to identify a particular word from a list of words. For example, the user interface may include radio buttons where the words are, bar, and star, and a request for the user to identify which of the words they heard from the auditory device (along with options for not hearing any speech or not being able to determine the identity of the word). This helps identify words or sound combinations that the user may have difficulty hearing.

In some embodiments, the user interface module 302 may generate graphical data for displaying a user interface that allows a user to repeat the hearing tests. For example, the user may feel that the results are inaccurate and may want to test their hearing to see if there has been an instance of hearing loss that was not identified during testing. In another example, a user may experience a change to their hearing conditions that warrant a new test, such as a recent infection that may have caused additional hearing loss.

In some embodiments, the user interface module 302 generates graphical data for displaying a user interface for determining user preferences for generating one or more presets, the specifics of which will be described in greater detail below with reference to the preset module 312. In some embodiments, the user preferences are determined after the hearing tests are completed. For example, after the pink band test is completed, the user interface module 302 may generate a user interface with questions about whether the user prefers the use of a noise cancellation preset or an ambient noise preset.

Figure 4C:
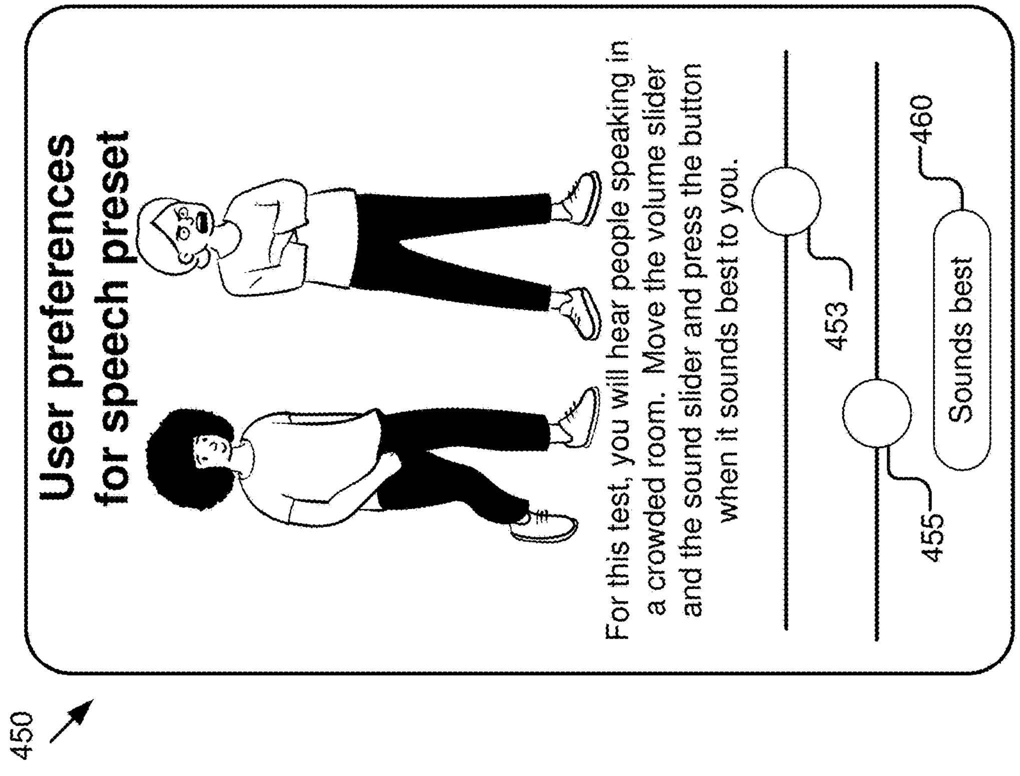
FIG. 4C is an example user interface for determining a user preference related to speech according to some embodiments described herein.

In yet another example, after the speech test is completed, the user interface module 302 may generate a user interface with questions about speech preferences, such as whether the user prefers a voice in a crowded room preset or a type of speech. FIG. 4C is an example user interface 450 for determining a user preference related to speech. In this example, the auditory device plays different settings that are possible for hearing voices in a crowded room. For example, a first preset reduces background noise and amplifies voices, a second preset reduces background noises and voices except for a voice closest to the user, etc. In this example, the user interface 450 includes a volume slider to adjust the volume of the sound and a sound slider 455 to allow the user to hear different presets. The user can select the button 460 when the user is satisfied with the preset. In another example, the user interface could include two sound slides, such as a first sound slide for modifying the background noise and a second sound slide for modifying the voices.

Figure 4D:
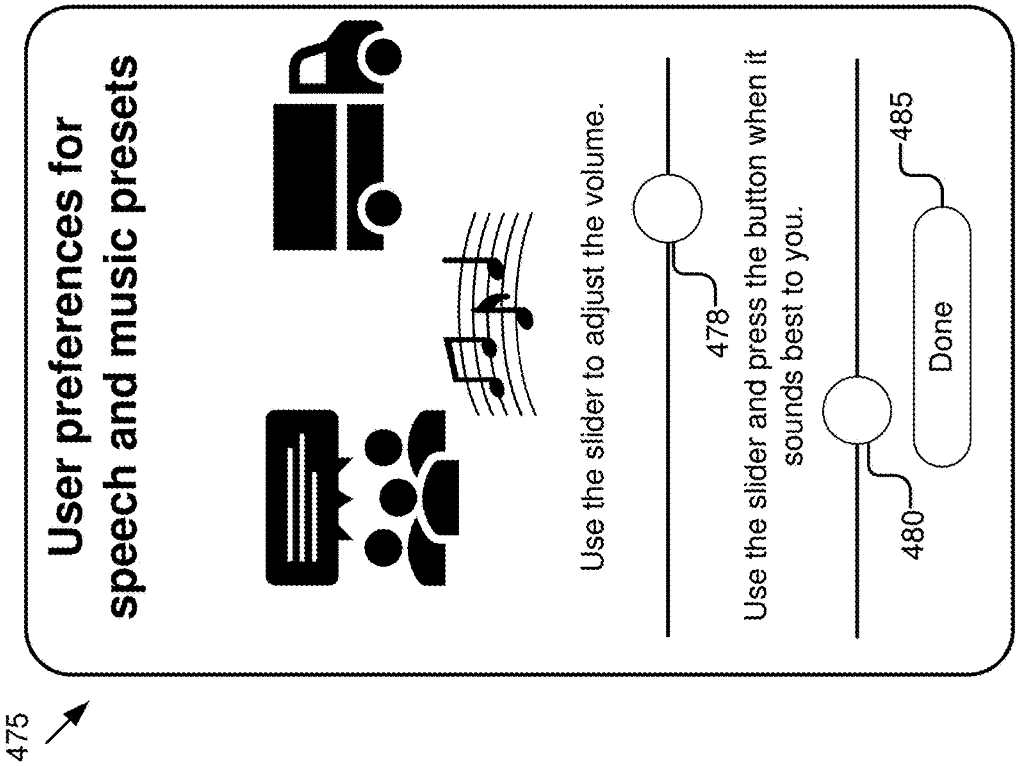
FIG. 4D is an example user interface for determining a user preference related to speech and music according to some embodiments described herein.

In another example, after the music test is completed, the user interface module 302 may generate a user interface with questions about music preferences, such as whether the user prefers an equalizer preset, a speech and music preset, a type of music, etc. In some embodiments, after the music test is completed, the user interface module 302 may generate a user interface with questions about speech and music preferences that is used by the profile module 310 to determine a speech and music preset. Turning to FIG. 4D, an example user interface 475 is illustrated for determining a user preference related to speech and music. In this example, the auditory device plays different sounds that may be difficult for the user to hear. For example, the auditory device may play sounds at specific frequencies or types of sounds. The user may move the volume slider 478 to change the overall volume so that it is not too loud or quiet and the sound slider 480 to adjust the options so that the speech and music are heard clearly. Once the user is satisfied with the volume slider 478 and the sound slider 480, the user may press the done button 485. The profile module 310 may use the user preferences to identify speech and music presets to prevent the auditory device from producing certain sounds and/or reducing the decibel level of certain sounds.

Other user interfaces may be used to determine the one or more presets. For example, instead of using a slider to change the types of noises, the user interface module 302 may generate a user interface that cycles through different situations and the user interface includes a slider for changing the decibel level or there may be no slider and instead the user preferences are determined with radio buttons, icons, vocal responses from the user, etc.

In some embodiments, the user interface module 302 generates graphical data for a user interface that includes icons for different presets that allows the user to modify the one or more presets. For example, the user interface may include an icon and associated text for a noise cancellation preset, an ambient noise preset, a speech and music preset, a type of noise preset, and a type of auditory condition. The type of noise preset may include individual icons for presets corresponding to each type of noise, such as one for construction noise and another for noises at a particular frequency. The type of auditory condition preset may include individual icons for presets corresponding to each type of auditory condition, such as an icon for tinnitus and an icon for phonophobia.

In some embodiments, the user interface module 302 generates graphical data for displaying a user interface that includes an option to override the one or more presets. For example, continuing with the example above, the user interface may include icons for different presets and selecting a particular preset causes the user interface to display information about the particular preset. For example, selecting the ambient noise preset may cause the user interface to show that the ambient noise preset is automatically on. The user may provide feedback, such as turning off the ambient noise preset so that it is automatically off. The profile module 310 may update the one or more presets based on the feedback from the user.

The pink band module 304 implements a pink noise band test. In some embodiments, the pink band module 304 includes a set of instructions executable by the processor 335 to implement the pink noise band test. In some embodiments, the pink band module 304 is stored in the memory 337 of the computing device 300 and can be accessible and executable by the processor 335.

Pink noise is a category of sounds that contains all the frequencies that a human ear can hear. Specifically, pink noise contains the frequencies from 20 Hertz to 20,000 Hertz. Although humans may be able to discern that range of frequencies, humans hear the higher frequencies less intensely. By testing the complete range of frequencies, pink noise band testing advantageously detects the full range of human hearing. Conversely, some traditional hearing tests stop testing after some frequencies in response to a user experiencing hearing loss at a particular frequency. Traditional hearing tests may miss the fact that certain hearing conditions only affect certain frequencies. For example, tinnitus may affect hearing sensitivity in frequencies between 250-16,000 Hertz, but does not necessarily affect all those frequencies. As a result, if a user experiences hearing loss at 4,000 Hertz due to tinnitus, the user may not have any hearing loss at 8,000-16,000 Hertz, which would be missed by a traditional hearing test.

Figure 5:
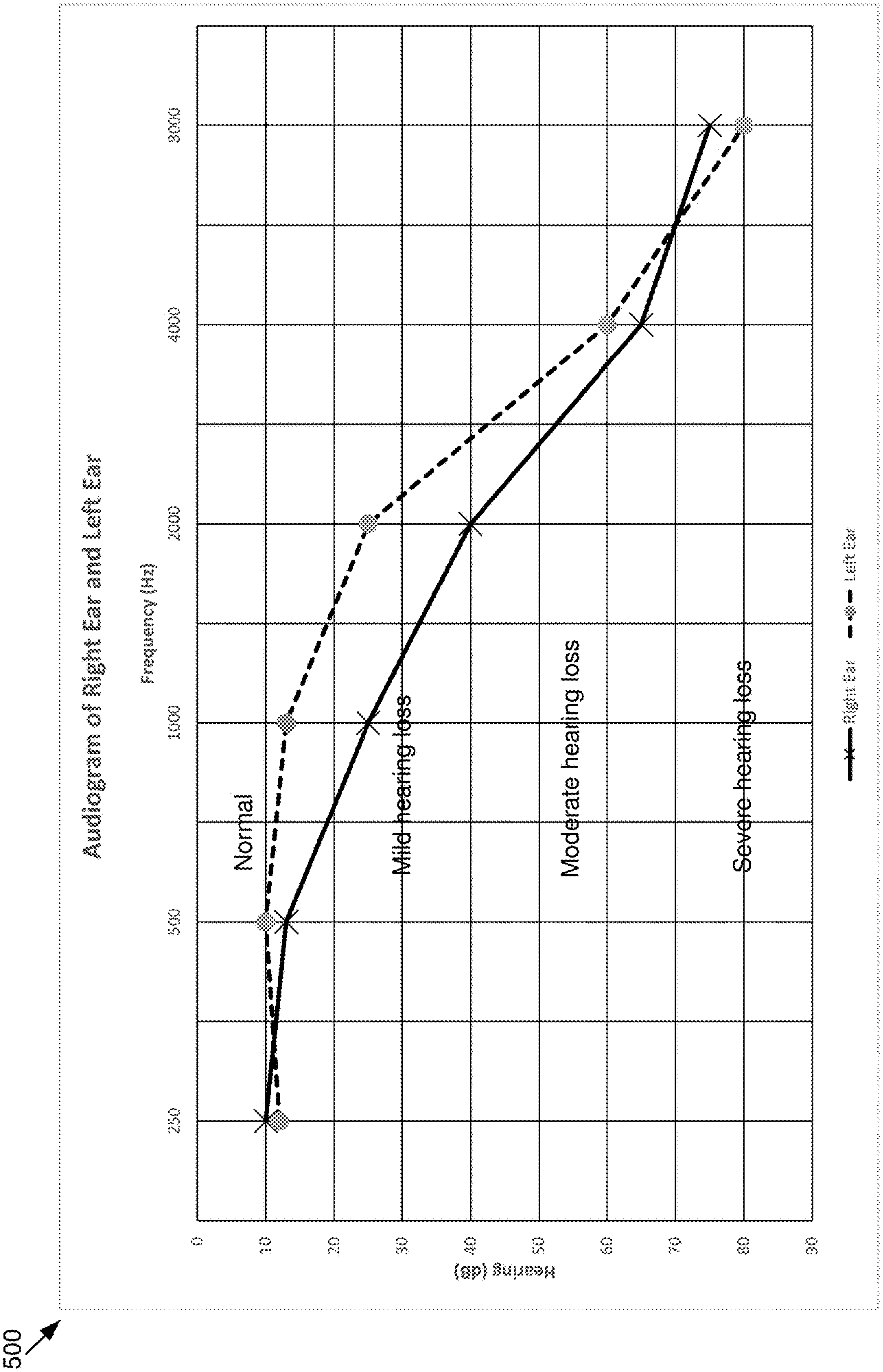
FIG. 5 is an illustration of an example audiogram of a right ear and a left ear according to some embodiments described herein.

Hearing may be tested in bands that span across different frequencies. Bands are like stereo equalizers. They control volume for different frequencies because a user may need higher volume for one band but not another. For example, FIG. 5 is an illustration of an example audiogram 500 of a right ear and a left ear. In this example, the hearing is tested using six frequency bands: 250 Hertz, 500 Hertz, 1000 Hertz, 2000 Hertz, 4000 Hertz, and 8000 Hertz. People may experience different levels of hearing loss depending on the frequencies. In this example, the left and right ears experience normal hearing until 1000 Hertz when the right ear experiences mild hearing loss where a hearing aid would need to add 20 decibels of gain to reach normal hearing. At 2000 Hertz the left ear experiences mild hearing loss and the right ear experiences between mild and moderate hearing loss. At 4000 Hertz both ears experience moderate hearing loss and the hearing aid would need to add 45 decibels of gain to reach normal hearing. At 8000 Hertz when both ears experience severe hearing loss.

In some embodiments, the pink band module 304 tests users at different levels of granularity based on a user selection. For example, the user may be provided with the option of a rough test, a middle test, and a fine test. The rough test may use bands between 80 Hertz through 5,600 Hertz for different bands. This may prevent a user from getting annoyed with excessive testing.

In some embodiments, the pink band module 304 may employ rough testing until the user identifies frequencies where the user's hearing is diminished and, at that stage, the pink band module 304 implements more narrow band testing. For example, the pink band module 304 may test every octave band until the user indicates that they cannot hear a sound in a particular band or the sound is played at a higher decibel level to be audible to the user for the particular band. At that point, the pink band module 304 may implement band testing below and above the particular band at intervals of one twelfth octave bands to further refine the extent of the user's hearing loss. In some embodiments, if the user experiences hearing loss in the lower frequencies, such as below 1000 Hertz, the pink band module 304 may test in smaller bandwidths than the higher frequencies.

In some embodiments, the pink band module 304 implements pink noise band testing by playing a test sound at a listening band, where the intervals for the listening bands may be based on the different factors discussed above. The pink band module 304 determines whether a confirmation was received that the user heard the test sound. If the pink band module 304 did not receive the confirmation that the user heard the test sound, the pink band module 304 may instruct the auditory device to increase the decibel level of the test sound until the confirmation is received or the test sound is played at a decibel level that meets a decibel threshold. For example, the decibel level may start at 0 decibels and the decibel threshold may be 85 decibels. Responsive to receiving the confirmation that the user heard the test sound or the test sound was played at the decibel threshold, the pink band module 304 may advance the listening band until the listening band meets a listening band total. During each step or at the conclusion of the pink band testing, the pink band module 304 updates the hearing profile with the test results.

In some embodiments, the pink band module 304 implements testing on a first ear and then on a second ear (e.g., first the left ear and then the right ear or first the right ear and then the left ear) and generates different profiles for each ear.

The speech module 306 implements a speech test. In some embodiments, the speech module 306 includes a set of instructions executable by the processor 335 to implement the speech test. In some embodiments, the speech module 306 is stored in the memory 337 of the computing device 300 and can be accessible and executable by the processor 335.

In some embodiments, the speech module 306 implements the speech test by instructing the auditory device to play different combinations of male speech, female speech, and at least two voices speaking simultaneously. In some embodiments, the speech test further includes different combinations of a child speaking. Male speech is typically between 85-155 Hertz and female speech is typically between 165-255 Hertz, but the consonants are often spoken at higher frequencies. In some embodiments, the speech module 306 instructs the auditory device to play the different combinations of speech at different frequencies. In some embodiments, the speech module 306 may skip frequencies where the user was identified as having significant hearing loss during the pink band testing.

In some embodiments, the speech module 306 implements speech testing by instructing the auditory device to play a test sound of speech. In some embodiments, the speech module 306 instructs the auditory device to play the test sound at a predetermined sound pressure level (SPL), such at 65 decibels SPL. SPL is a decibel scale that is defined relative to a reference that is approximately the intensity of a 1000 Hertz sinusoid that is just barely audible to the user. In some embodiments, the speech module 306 instructs the auditory device to play the test sound a predetermined level (e.g., 40 decibels) above the softest level at which the user begins to recognize speech or the tones from the pink band testing. The speech module 306 determines whether confirmation was received that the user heard the test sound. In some embodiments, the speech module 306 also determines whether the user identified the test sound as corresponding to a correct word from a list of words.

Responsive to not receiving the confirmation or determining that a threshold amount of time has elapsed (such as two seconds, five seconds, etc.), the speech module 306 determines whether all test sounds in a set of test sounds have been played. The speech module 306 continues to repeat the previous steps until all the test sounds in the set of test sounds are played.

In some embodiments, the speech module 306 implements testing on a first ear and then on a second ear (e.g., first the left ear and then the right ear or first the right ear and then the left ear) and generates different profiles for each ear.

The music module 308 implements a music test. In some embodiments, the music module 308 includes a set of instructions executable by the processor 335 to implement the music test. In some embodiments, the music module 308 is stored in the memory 337 of the computing device 300 and can be accessible and executable by the processor 335.

In some embodiments, the music module 308 implements the music test by instructing the auditory device to play different combinations of discrete musical instrument sounds, combinations of sounds of musical instruments, acoustic musical sounds, electrical musical sounds, musical instrument sounds and a voice played together, etc. For example, one test sound may include violin music and horn sounds. In some embodiments, the music module 308 plays different combinations of notes at the same decibel level.

In some embodiments, the music module 308 instructs the auditory device to play the different combinations of music at different frequencies. For example, the frequencies may include a range of a piano scale from around 27 Hertz to over 4,000 Hertz. In some embodiments, the music module 308 may skip frequencies where the user was identified as having significant hearing loss during the pink band testing.

In some embodiments, the music module 308 implements music testing by instructing the auditory device to play a test sound of music. In some embodiments, the speech module 306 instructs the auditory device to play the test sound at a predetermined SPL, such at 65 decibels SPL. In some embodiments, the music module 308 instructs the auditory device to play the test sound a predetermined level (e.g., 40 decibels) above the softest level at which the user begins to recognize music or the tones from the pink band testing. The music module 308 determines whether confirmation was received that the user heard the test sound. Responsive to not receiving the confirmation or determining that a threshold amount of time has elapsed (such as two seconds, five seconds, etc.), the music module 308 determines whether all test sounds in a set of test sounds have been played. The music module 308 continues to repeat the previous steps until all the test sounds in the set of test sounds are played.

In some embodiments, the music module 308 implements testing on a first ear and then on a second ear (e.g., first the left ear and then the right ear or first the right ear and then the left ear) and generates different profiles for each ear.

The profile module 310 generates and updates a hearing profile associated with a user. In some embodiments, the profile module 310 includes a set of instructions executable by the processor 335 to generate the hearing profile. In some embodiments, the profile module 310 is stored in the memory 337 of the computing device 300 and can be accessible and executable by the processor 335.

The profile module 310 generates a hearing profile after receiving user input provided via the user interface. In some embodiments, the profile module 310 updates the hearing profile each time the pink band module 304, the speech module 306, or the music module 308 transmits updates to the profile module 310. These modules may send updates each time a piece of information is determined, such as each time a test sound is heard by the user, or at the end of a testing process.

In some embodiments, the profile module 310 modifies the hearing profile to include instructions for producing sounds based on a corresponding frequency according to a Fletcher Munson curve. The Fletcher Munson curve identifies a phenomenon of human hearing where as an actual loudness changes, the perceived loudness that a human's brain hears will change at a different rate, depending on the frequency. For example, at low listening volumes mid-range frequencies sound more prominent, while the low and high frequency ranges seem to fall into the background. At high listening volumes the lows and highs sound more prominent, while the mid-range seems comparatively softer.

In some embodiments, the profile module 310 receives an audiometric profile from the server and compares the hearing profile to the audiometric profile in order to make recommendations for the user. In some embodiments, the profile module 310 modifies the hearing profile to include instructions for producing sounds based on a comparison of the hearing profile to the audiometric profile. For example, the profile module 310 may identify that there is a 10-decibel hearing loss at 400 Hertz based on comparing the hearing profile to the audiometric profile and the hearing profile is updated with instructions to produce sounds by increasing the auditory device by 10 decibels for any noises that occur at 400 Hertz.

The preset module 312 determines one or more presets that correspond to a user preference. In some embodiments, the preset module 312 includes a set of instructions executable by the processor 335 to generate the one or more presets. In some embodiments, the preset module 312 is stored in the memory 337 of the computing device 300 and can be accessible and executable by the processor 335.

In some embodiments, the preset module 312 assigns one or more default presets. The one or more default presets may be based on the most common presets used by users. In some embodiments, the one or more default presets may be based on the most common presets used by users of a particular demographic (e.g., based on sex, age, similarity of user profiles, etc.). The preset module 312 may implement testing to determine user preferences that correspond to the one or more presets or the preset module 312 may update the one or more default presets in response to receiving feedback from the user.

The preset module 312 generates one or more presets that modify settings established in the hearing profile. In some embodiments, the profile module 310 generated a hearing profile for a first type of auditory device and the preset module 312 generates a preset for a second type of auditory device. For example, the hearing profile may be generated based on tests for a laptop speaker. The preset module 312 may determine a preset for earbuds that modifies the settings established by the hearing profile. For example, the decibel level is decreased for the earbuds since they are closer to the ear than a laptop speaker.

The preset module 312 determines one or more presets that correspond to a user preference. For example, the presets include a noise cancellation preset, an ambient noise preset, a speech and music preset, a music in a room preset, a voice in a crowded room preset, a type of enclosure, a type of speech, a type of music, a type of noise, a type and model of auditory device, and/or a type of auditory condition.

The noise cancellation preset removes external noise from the auditory device. For example, the auditory device may include microphones that detect sounds and speakers that emit signals that cancel out the noise frequencies to cancel out both sets of sounds when the soundwaves from the noise and the signals collide. In some embodiments, the preset module 312 determines that the user prefers the noise cancellation preset and, as a result, the noise cancellation preset is automatically used. In some embodiments, the noise cancellation preset is applied to particular situations. For example, the preset module 312 may determine that the user wants the noise cancellation preset to be activated when the user enters a crowded room, but not when the user is in a quiet room or in a vehicle.

The ambient noise preset causes the auditory device to provide a user with surrounding outside noises while also playing other sounds, such as music, a movie, etc. The auditory device may include microphones that detect the outside noises and provide the outside noises to the user with speakers. In some embodiments, the preset module 312 determines that the user prefers the ambient noise preset and, as a result, the ambient noise preset is automatically used. In some embodiments, the ambient noise preset is applied to particular situations. For example, the preset module 312 may determine that the user wants the ambient noise preset to be activated when the user is outside (such as if the user is running), but not when the user is inside an enclosure (such as a room or a vehicle).

In some embodiments, the preset module 312 generates a noise cancellation and ambient noise preset that may cause the auditory device to provide a user with noise cancellation of noises that are not directly surrounding the user while allowing in sounds that directly surround the user through the ambient noise aspect of the preset. In some examples, the noise cancellation and ambient noise preset includes three options: a first setting activates the ambient noise function and the noise cancellation function, a second setting turns off the noise-cancellation function so only the ambient noise function is active, and a third setting turns off the ambient noise function so only the noise cancellation function is activated.

In some embodiments, the preset module 312 identifies a speech and music preset that combines user preferences for speech and music or separately identifies a speech preset and a music preset. The speech preset may include a variety of different user preferences relating to speech. For example, during speech band testing, the preset module 312 may identify that the user has difficulty hearing certain sounds in speech, such as words that begin with "th" or "sh." As a result, the speech preset may include amplification of words that use those particular sounds.

The music preset may include a variety of different user preferences relating to music. For example, the user may identify that there are certain frequencies or situations during which the user experiences hypersensitivity. For example, the user may identify a particular frequency that causes distress (such as using the user interface illustrated in FIG. 4C); or a particular action that bothers a user (such as construction noises) or based on a particular condition like misophonia (such as chewing or sniffing noises).

In yet another example, the preset module 312 may determine that a user prefers equalizer settings to be activated. Equalizers are software or hardware filters that adjust the loudness of specific frequencies. Equalizers work in bands, such as treble bands and bass bands, which can be increased or decreased. As a result of applying equalizer settings, the user may hear all frequencies with the same perceived loudness based on adjusting the decibel levels based on the music testing.

In some embodiments, the presets may include more specific situations, such as a music in a room preset that causes the auditory device to apply different music settings in a room based on user preferences. The advantage to having this more specific presets is that it may be easier for a user to modify the specific preset for music in a room than having to repeat the entire process of identifying user preferences in order to modify this one particular preference. Similarly the presets may include a voice in a crowded room preset because a user may have particular difficulty with hearing voices in a crowded room, but may not struggle with other types of background noise. As a result, the user may want the voice in a crowded room preset to be active, but not want the noise cancellation preset to be automatically activated.

In some embodiments, the presets may be even more specific and include a preset for a type of enclosure, a type of speech, a type of music, a type of noise, a type and model of auditory device, and/or a type of auditory condition. The type of enclosure may include a small room (e.g., an office), a medium room (e.g., a restaurant), a large room (e.g., a conference hall), a car, etc. The type of speech may include particular words or sounds that the user has difficulty hearing and, as a result, are amplified. The type of music may include particular instruments (e.g., a preference to avoid shrill sounds, such as a violin) or music genres (e.g., a preference to avoid playing music with deep base unless the decibel level for the base is reduced).

In some embodiments, the preset module 312 includes a machine-learning model to determine the one or more presets. The training data may be labelled with one or more presets corresponding to users with different demographics (e.g., sex, age, auditory conditions, etc.). The preset module 312 may train the machine-learning model using supervised training data to receive a hearing profile as input and output the one or more presets.

In some embodiments, the preset module 312 receives feedback from a user. The user may provide user input to a user interface that changes one or more presets. For example, the user may change a preset for a type of enclosure for a vehicle to automatically apply noise cancellation to the road noise and amplify voices inside the vehicle. The preset module 312 updates the one or more presets based on the feedback. For example, the preset module 312 may change the preset for the type of enclosure from off to on. In some embodiments, the preset module 312 does not change the one or more presets until a threshold amount of feedback has been received. For example, the preset module 312 may not change a preset until the user has changed the preset a threshold of four times (or three, five, etc.).

The profile module 310 transmits the hearing profile and/or the preset module 312 transmits the one or more presets to the auditory device and/or a server for storage via the I/O interface 339.

Example Methods

Figure 6:
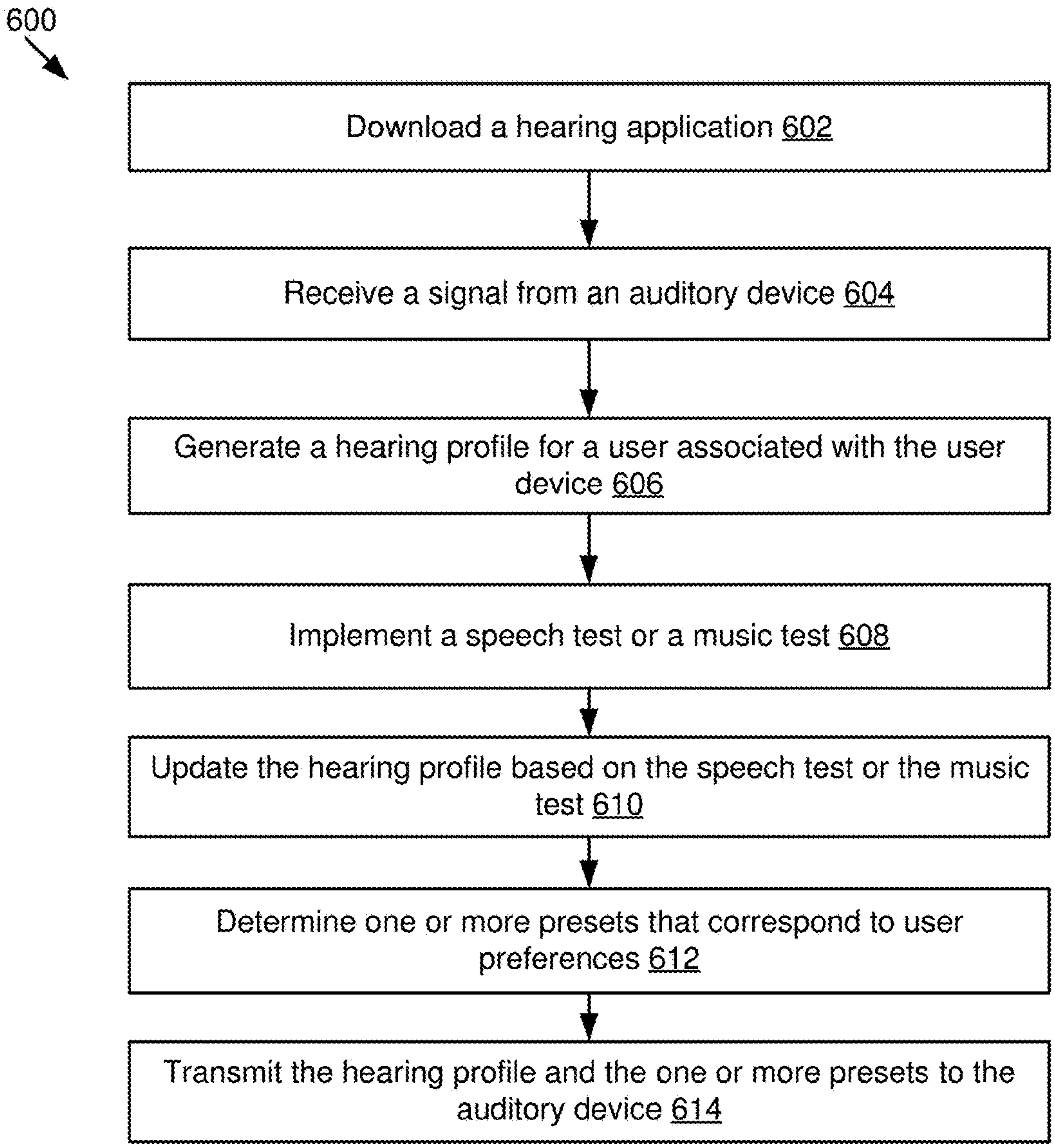
FIG. 6 illustrates a flowchart of a method to generate a hearing profile and one or more presets according to some embodiments described herein.

FIG. 6 illustrates a flowchart of a method 600 to generate a hearing profile and one or more presets. The method 600 may be performed by the computing device 300 in FIG. 3. For example, the computing device 300 may be the user device 115 or the auditory device 120 illustrated in FIG. 1. The computing device 300 includes a hearing application 103 that implements the steps described below.

In embodiments where the method 600 is performed by the user device 115 in FIG. 1, the method 600 may start with block 602. At block 602, a hearing application is downloaded. In embodiments where the method 600 is performed by the auditory device 120, the method may start with block 606. Block 602 may be followed by block 604.

At block 604, a signal is received from an auditory device. For example, the signal may be for establishing a Bluetooth connection with a user device. Block 604 may be followed by block 606.

At block 606, a hearing profile is generated for a user associated with the user device. Block 606 may be followed by block 608.

At block 608, a speech test or a music test is implemented. The speech test may include the method 800 described in FIG. 8. The music test may include the method 900 described in FIG. 9. In some embodiments, a pink noise band test is also implemented. For example, the pink noise band test may include the method 700 described in FIG. 7. Block 608 may be followed by block 610.

At block 610, the hearing profile is updated based on the speech test or the music test. The hearing profile may be stored locally on the user device 115 or the auditory device 120 in FIG. 1 and/or on the server 101 in FIG. 1. Block 610 may be followed by block 612.

At block 612, one or more presets are determined that correspond to user preferences. For example, a user interface may be generated with questions about difference user preferences for sounds at particular frequencies, types of sounds, types of speech, types of situations where noise interferes with hearing voices, etc.

At block 614, the hearing profile and the one or more presets are transmitted to the auditory device.

Figure 7:
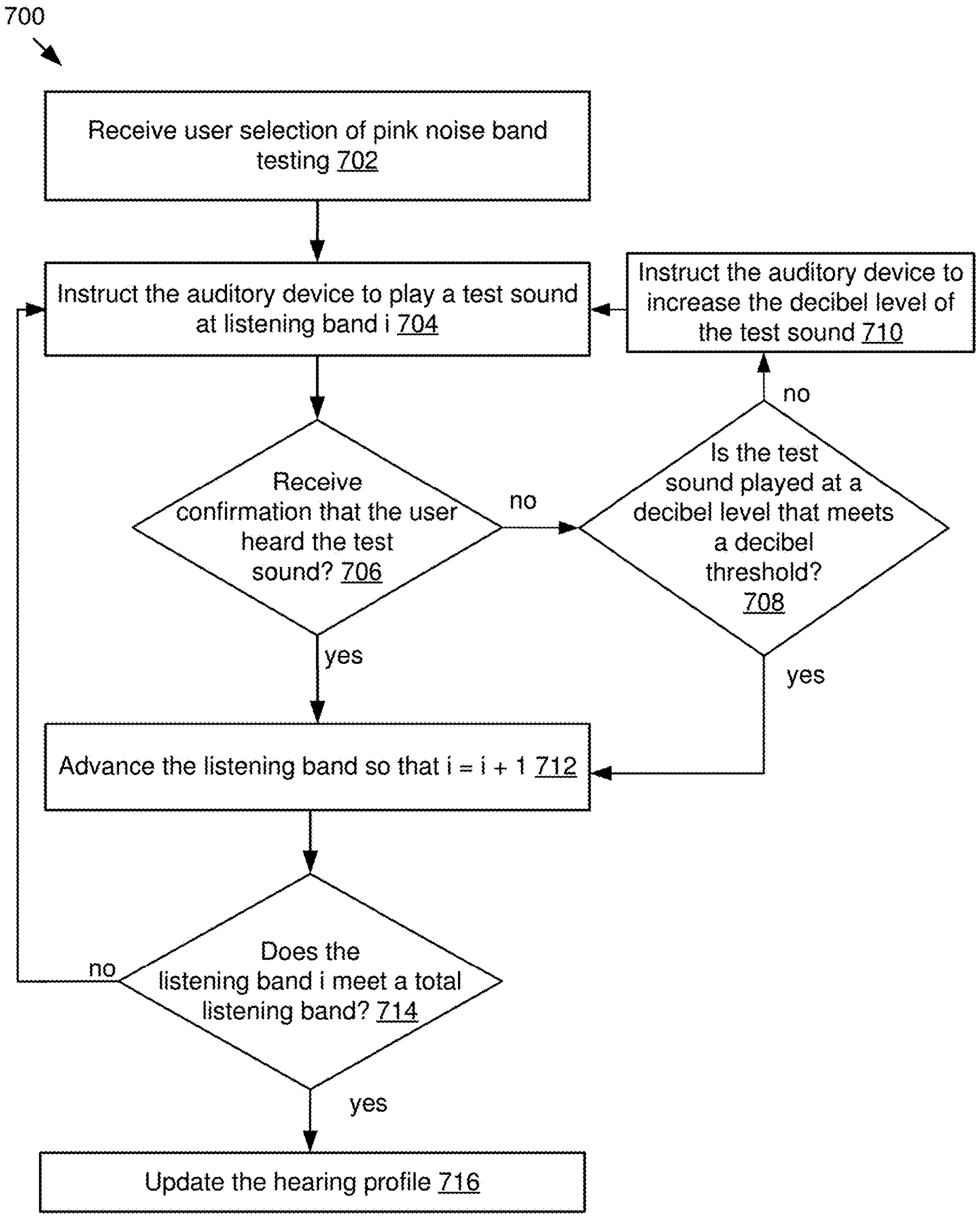
FIG. 7 illustrates a flowchart of a method to implement pink noise band testing according to some embodiments described herein.

FIG. 7 illustrates a flowchart of a method 700 to implement pink noise band testing according to some embodiments described herein. The method 700 may be performed by the computing device 300 in FIG. 3. For example, the computing device 300 may be the user device 115 or the auditory device 120 illustrated in FIG. 1. The computing device 300 includes a hearing application 103 that implements the steps described below.

The method 700 may start with block 702. At block 702, user selection of pink noise band testing is received. Block 702 may be followed by block 704.

At block 704, the auditory device is instructed to play a test sound at listening band i. Block 704 may be followed by block 706.

At block 706, it is determined whether a confirmation is received that the user heard the test sound. For example, the user may select an icon on a user interface when the user hears a test sound. If the confirmation is not received, block 706 may be followed by block 708. At block 708, it is determined whether the sound played at a decibel level meets a decibel threshold. For example, the decibel threshold may be 85 decibels because after 85 decibels the sound may cause hearing damage to the user. If the sound does not meet the decibel threshold, block 708 may be followed by block 710. At block 710, the auditory device is instructed to increase the decibel level of the test sound.

If confirmation is received that the user heard the test sound, block 706 may be followed by block 712. At block 712, the listening band is advanced a subsequent increment so that i=i+1. At block 708, if the test sound is played at a decibel level that meets a decibel threshold, block 708 may be followed by 712. Block 712 may be followed by block 714.

At block 714, it is determined whether the listening band i meets a total listening band. If the listening band i does not meet the total listening band, block 714 is followed by block 704. If the listening band i does meet the total listening band, block 714 is followed by block 716.

At block 716, the hearing profile is updated. The hearing profile may be stored locally on the user device 115 or the auditory device 120 in FIG. 1 and/or on the server 101 in FIG. 1.

Figure 8:
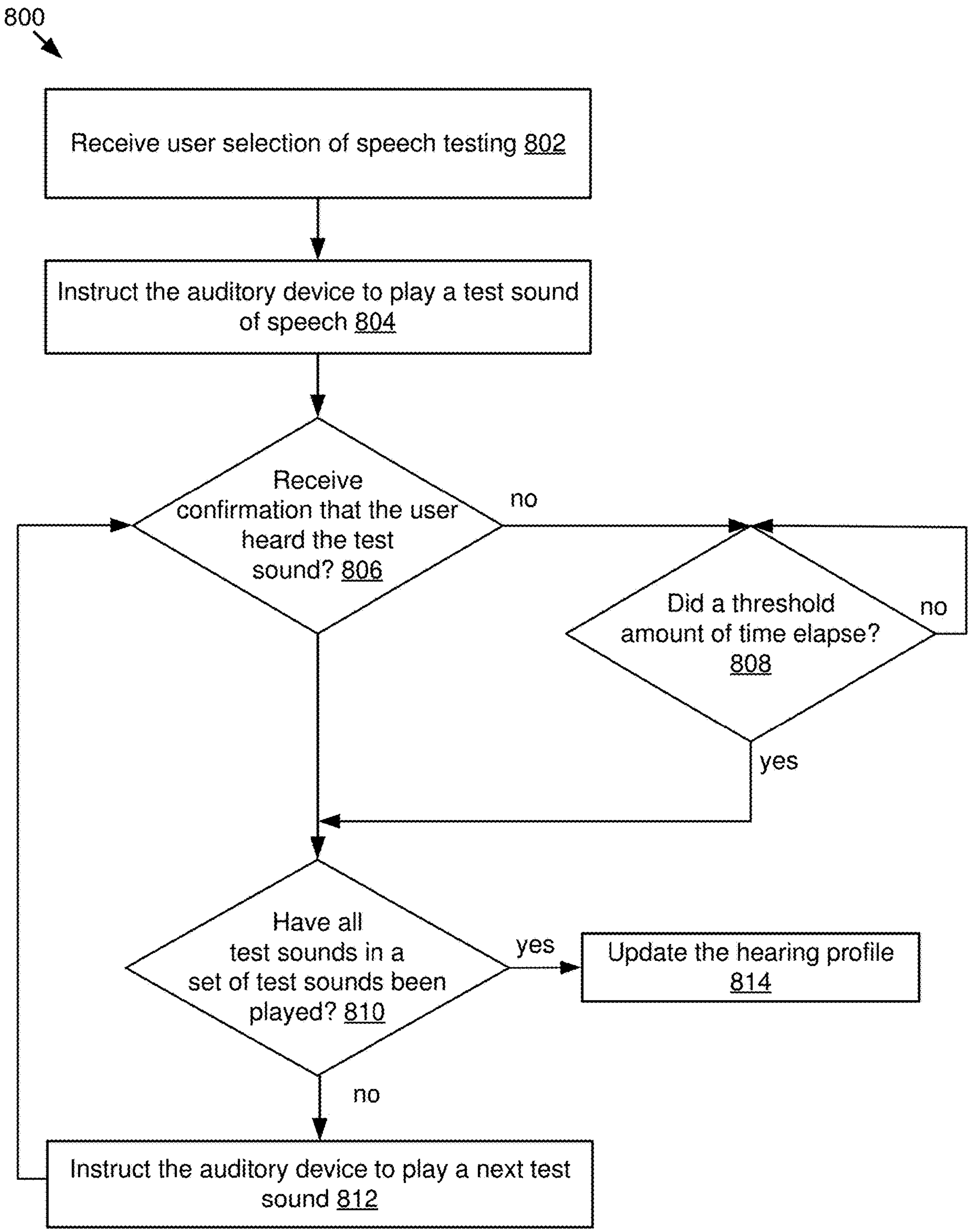
FIG. 8 illustrates a flowchart of a method to implement speech testing according to some embodiments described herein.

FIG. 8 illustrates a flowchart of a method 800 to implement speech testing according to some embodiments described herein. The method 800 may be performed by the computing device 300 in FIG. 3. For example, the computing device 300 may be the user device 115 or the auditory device 120 illustrated in FIG. 1. The computing device 300 includes a hearing application 103 that implements the steps described below.

The method 800 may start with block 802. At block 802, user selection of speech testing is received. Block 802 may be followed by block 804.

At block 804, the auditory device is instructed to play a test sound of speech. Block 804 may be followed by block 806.

At block 806, it is determined whether a confirmation is received that the user heard the test sound. If confirmation is not received that the user heard the test sound, block 806 may be followed by block 808. At 808 it is determined whether a threshold amount of time has elapsed. For example, the threshold may be 1 second, 2 seconds, 3 seconds, etc. If the threshold amount of time did not elapse, block 808 repeats until the threshold amount of time elapses. If the threshold amount of time did elapse, block 808 is followed by block 810.

At block 810, it is determined whether all test sounds in a set of test sounds have been played. The set of test sounds may include male speech, female speech, and at least two voices speaking simultaneously. If all test sounds in the set of test sounds have not been played, block 810 is followed by block 812. At block 812, the auditory device is instructed to play a next test sound. Block 812 is followed by block 806.

If all test sounds in the set of test sounds have been played, block 810 is followed by block 814. At block 814, the hearing profile is updated. The hearing profile may be stored locally on the user device 115 or the auditory device 120 in FIG. 1 and/or on the server 101 in FIG. 1.

Figure 9:
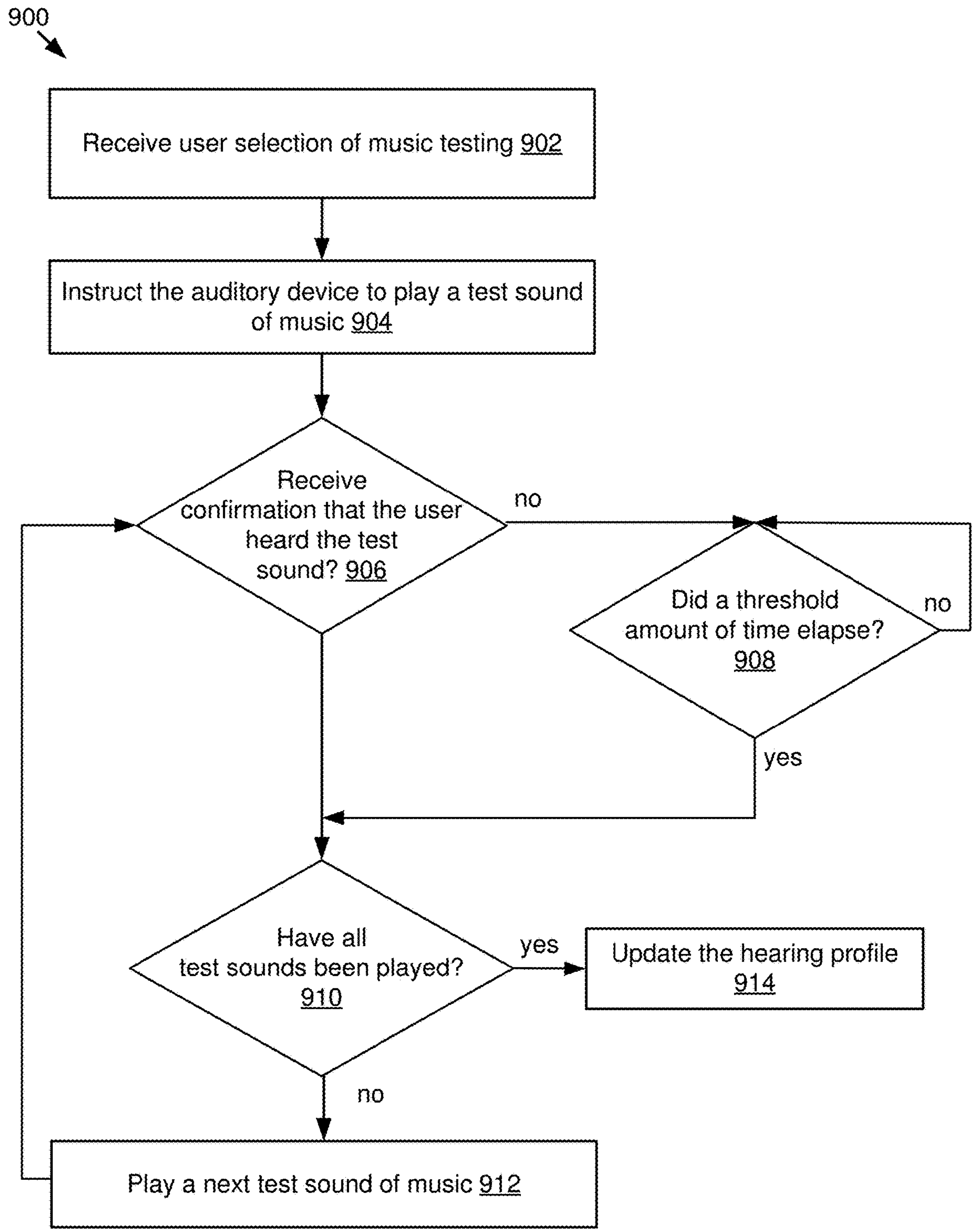
FIG. 9 illustrates a flowchart of a method to implement music testing according to some embodiments described herein.

FIG. 9 illustrates a flowchart of a method to implement music testing according to some embodiments described herein. The method 900 may be performed by the computing device 300 in FIG. 3. For example, the computing device 300 may be the user device 115 or the auditory device 120 illustrated in FIG. 1. The computing device 300 includes a hearing application 103 that implements the steps described below.

The method 900 may start with block 902. At block 902, user selection of music testing is received. Block 902 may be followed by block 904.

At block 904, the auditory device is instructed to play a test sound of music. Block 904 may be followed by block 906.

At block 906, it is determined whether a confirmation is received that the user heard the test sound. If confirmation is not received that the user heard the test sound, block 906 may be followed by block 908. At 908 it is determined whether a threshold amount of time has elapsed. For example, the threshold may be 1 second, 2 seconds, 3 seconds, etc. If the threshold amount of time did not elapse, block 908 repeats until the threshold amount of time elapses. If the threshold amount of time did elapse, block 908 is followed by block 910.

At block 910, it is determined whether all test sounds in a set of test sounds have been played. The set of test sounds may include discrete musical instrument sounds, combinations of sounds of musical instruments, acoustic musical sounds, electric musical sounds, and musical instrument sounds and a voice played together. If all test sounds in the set of test sounds have not been played, block 910 is followed by block 912. At block 912, the auditory device is instructed to play a next test sound. Block 912 is followed by block 906.

If all test sounds in the set of test sounds have been played, block 910 is followed by block 914. At block 914, the hearing profile is updated. The hearing profile may be stored locally on the user device 115 or the auditory device 120 in FIG. 1 and/or on the server 101 in FIG. 1.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method performed on a user device, the method comprising:
- receiving a signal from an auditory device;
- generating a hearing profile for a user associated with the user device;
- implementing a speech test or a music test;
- updating the hearing profile based on the speech test or the music test;
- determining one or more presets that correspond to user preferences; and
- transmitting the hearing profile and the one or more presets to the auditory device.

2. The method of claim 1, wherein the auditory device is a first type of auditory device and the one or more presets include a preset for a second type of auditory device.

3. The computer-implemented method of claim 1, wherein determining the one or more presets includes:
- generating graphical data for displaying a user interface that includes an option for specifying that the one or more presets are selected from a group of a noise cancellation preset, an ambient noise preset, a speech and music preset, a music in a room preset, a voice in a crowded room preset, and combinations thereof.

4. The computer-implemented method of claim 1, wherein determining the one or more presets includes:
- generating graphical data for displaying a user interface that includes an option for providing the user preferences that includes one or more presets selected from a group of a type of enclosure, a type of speech, a type of music, a type of noise, a type and model of auditory device, a type of auditory condition, and combinations thereof.

5. The computer-implemented method of claim 1, further comprising:
- generating graphical data for displaying a user interface that includes an option to change the one or more presets.

6. The computer-implemented method of claim 1, further comprising:
- receiving feedback from the user to change the one or more presets; and
- updating the one or more presets based on the feedback.

7. The computer-implemented method of claim 1, wherein determining the one or more presets includes asking a user to identify one or more auditory conditions that affect hearing.

8. The computer-implemented method of claim 1, further comprising implementing a pink noise band test by:
- instructing the auditory device to play a test sound at a listening band;
- determining whether a confirmation was received that the user heard the test sound;
- responsive to not receiving the confirmation, instructing the auditory device to increase a volume of the test sound until the confirmation is received or the test sound is played at a decibel level that meets a decibel threshold;
- responsive to receiving the confirmation that the user heard the test sound or the test sound was played at the decibel threshold is met, advancing the listening band to a subsequent increment;
- continuing to repeat previous steps until the listening band meets a listening band total; and
- updating the hearing profile based on the pink noise band test.

9. The computer-implemented method of claim 1, wherein the speech test is implemented by:
- instructing the auditory device to play a test sound of speech;
- determining whether a confirmation was received that the user heard the test sound;
- responsive to receiving the confirmation that the user heard the test sound or determining that a threshold amount of time has elapsed, determining whether all test sounds in a set of test sounds have been played; and
- continuing to repeat the previous steps until the test sounds in the set of test sounds have been played.

10. The computer-implemented method of claim 1, wherein the music test is implemented by:
- instructing the auditory device to play a test sound of music;
- determining whether a confirmation was received that the user heard the test sound;
- responsive to receiving the confirmation that the user heard the test sound or determining that a threshold amount of time has elapsed, determining whether all test sounds in a set of test sounds have been played; and
- continuing to repeat the previous steps until the test sounds in the set of test sounds have been played.

11. The computer-implemented method of claim 1, further comprising:
- modifying the hearing profile to include instructions for producing sounds based on a corresponding frequency according to a Fletcher Munson curve.

12. An apparatus comprising:
- one or more processors; and
- logic encoded in one or more non-transitory media for execution by the one or more processors and when executed are operable to:
- receive a signal from an auditory device;
- generate a hearing profile for a user associated with the user device;

implement a speech test or a music test;

update the hearing profile based on the speech test or the music test;

determine one or more presets that correspond to user preferences; and transmit the hearing profile and the one or more presets to the auditory device.

13. The apparatus of claim 12, wherein the auditory device is a first type of auditory device and the one or more presets include a preset for a second type of auditory device.

14. The apparatus of claim 12, wherein determining the one or more presets includes:

generating graphical data for displaying a user interface that includes an option for specifying that the one or more presets are selected from a group of a noise cancellation preset, an ambient noise preset, a speech and music preset, a music in a room preset, a voice in a crowded room preset, and combinations thereof.

15. The apparatus of claim 12, wherein determining the one or more presets includes:

generating graphical data for displaying a user interface that includes an option for providing the user preferences that includes one or more presets selected from a group of a type of enclosure, a type of speech, a type of music, a type of noise, a type and model of auditory device, a type of auditory condition, and combinations thereof.

16. The apparatus of claim 12, wherein the one or more processors are further operable to:

generate graphical data for displaying a user interface that includes an option to change the one or more presets.

17. Software encoded in one or more computer-readable media for execution by the one or more processors and when executed is operable to:

receive a signal from an auditory device;

generate a hearing profile for a user associated with the user device;

implement a speech test or a music test;

update the hearing profile based on the speech test or the music test;

determine one or more presets that correspond to user preferences; and transmit the hearing profile and the one or more presets to the auditory device.

18. The software of claim 17, wherein determining the one or more presets includes:

generating graphical data for displaying a user interface that includes an option for specifying that the one or more presets are selected from a group of a noise cancellation preset, an ambient noise preset, a speech and music preset, a music in a room preset, a voice in a crowded room preset, and combinations thereof.

19. The software of claim 17, wherein determining the one or more presets includes:

generating graphical data for displaying a user interface that includes an option for providing the user preferences that includes one or more presets selected from a group of a type of enclosure, a type of speech, a type of music, a type of noise, a type and model of auditory device, a type of auditory condition, and combinations thereof.

20. The software of claim 17, wherein the one or more processors are further operable to:

generate graphical data for displaying a user interface that includes an option to change the one or more presets.

* * * * *